United States Patent
Anders et al.

(10) Patent No.: US 6,359,042 B1
(45) Date of Patent: Mar. 19, 2002

(54) POLYCARBONATE MOULDING COMPOUNDS AND THEIR USE AS LAYERS IN COEXTRUDED SHEETS

(75) Inventors: Siegfried Anders, Köln; Hartmut Löwer, Krefeld; Wolfgang Nising, Sankt Augustin; Wilfried Haese, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/462,850

(22) PCT Filed: Jul. 14, 1998

(86) PCT No.: PCT/EP98/04356

§ 371 Date: Jan. 15, 2000

§ 102(e) Date: Jan. 15, 2000

(87) PCT Pub. No.: WO99/05205

PCT Pub. Date: Feb. 4, 1999

(30) Foreign Application Priority Data

Jul. 25, 1997 (DE) .......................... 197 32 090

(51) Int. Cl.$^7$ .......................... C08L 69/00; C08K 5/103; C08K 5/3475

(52) U.S. Cl. .......................... 524/91; 524/105; 524/310; 524/311; 524/317; 524/318; 428/412; 264/173.16

(58) Field of Search .......................... 524/91, 105, 310, 524/311, 317, 318; 428/412; 264/173.16

(56) References Cited

U.S. PATENT DOCUMENTS

| 4,131,575 A | 12/1978 | Adelmann et al. |
| 4,670,479 A | 6/1987 | Miyauchi .................... 524/154 |
| 4,845,193 A | 7/1989 | Umemura et al. .......... 528/502 |
| 5,108,835 A | 4/1992 | Hähnsen et al. ............. 428/334 |
| 5,856,012 A | 1/1999 | Kuhling et al. ............. 428/412 |

FOREIGN PATENT DOCUMENTS

| DE | 2729485 | * | 1/1978 |
| EP | 320632 | * | 6/1989 |
| EP | 492550 | * | 7/1992 |
| EP | 575177 | * | 12/1993 |
| EP | 0 732 360 | | 9/1996 |
| EP | 764686 | * | 3/1997 |
| JP | 2-225558 | * | 9/1990 |
| JP | 7-126505 | * | 5/1995 |

* cited by examiner

Primary Examiner—David J. Buttner
(74) Attorney, Agent, or Firm—Joseph C. Gil; Aron Preis

(57) ABSTRACT

A polycarbonate molding composition containing a UV absorber and two types of mold release agents is disclosed. The composition is suitable for use as coating or external layer on coextruded sheets.

7 Claims, No Drawings

POLYCARBONATE MOULDING COMPOUNDS AND THEIR USE AS LAYERS IN COEXTRUDED SHEETS

The present invention provides moulding compositions
a) containing thermoplastic, aromatic polycarbonates with a weight average molecular weight $\overline{M}_w$ (measured in a known manner) of 27,000 to 40,000, preferably 30,000 to 36,000 and in particular 32,000 to 36,000,
b) a concentration of UV absorber, which has a molecular weight of 370, preferably 500 or greater, in particular 500 to 3000, in amounts of 3.5 to 20 wt. %, preferably 5 wt. % to 15 wt. %, with respect to the weight of polycarbonate, and
c) two types of mould release agents comprising
   c.1) monoesters formed from glycerine and a fatty acid in amounts of 0.01 to 0.1 wt. %, with respect to the weight of polycarbonate and
   c.2) (partial)esters of tetra- to hexahydric alcohols in amounts of 0.05 to 0.25 wt. %, with respect to the weight of polycarbonate, which are characterised in that the ratio by weight of c.1) to c.2) is between 1:25 and 1:2 and preferably between 4:25 and 10:25.

Polycarbonate moulding compositions according to the invention are particularly suitable as coatings for polycarbonate sheets which are preferably prepared by the coextrusion process.

Thus the invention also provides the use of polycarbonate moulding compositions according to the invention as UV absorber-containing coverings, preferably as an external layer, on coextruded polycarbonate sheets.

The invention also provides a process for preparing laminated materials comprising thermoplastic polycarbonates by the known coextrusion method, which is characterised in that polycarbonate moulding compositions according to the invention are used as the external layer of the laminated material.

In addition, the invention provides laminated materials consisting of thermoplastic aromatic polycarbonates obtained by the process according to the invention.

EP-A-0 320 632 (Le A 25 600) describes coextruded sheets made from UV absorber-containing polycarbonates with a relative solution viscosity of 1.31 (measured at 25° C. in 0.5% strength solution in dichloromethane), which corresponds to a $\overline{M}_w$ (weight average molecular weight) of about 31,000 (page 10, example). The UV absorbers have a $\overline{M}_n > 500$ and are particularly preferably used in amounts of 5 wt. %. to 10 wt. % (page 2, line 38). Lubricants and/or mould release agents may be added (page 9, line 43).

These types of sheet may now be optimised with regard to the transverse unevenness of the surface of the sheets, the evaporation of the UV absorber from the polycarbonate melt, in particular during coextrusion while applying a vacuum, which is required in order to produce sheets with hollow cavities, and with regard to polycarbonate abrasion which can be caused by the sizing unit in the extruder during cooling of the coextruded polycarbonate sheets.

Increased evaporation of the UV absorber from the polycarbonate melt leads to fouling of the sizing unit and then to the production of white spots on the surface of the sheets. Polycarbonate abrasion leads to powdery deposits on the coextruded polycarbonate sheets.

The object of the present invention was to make the coextrusion process in accordance with EP 0 320 632 more reliable, that is to retain the good quality of the surfaces of the coextruded polycarbonate sheets or even to improve them during long term operation, in particular with a continuous mode of operation. This is achieved in accordance with the invention by adding a specific combination of esters.

Although EP-B-0 213 413 describes the use of combinations of esters (page 6, lines 25 to 37) in polycarbonates, the amount of UV absorber is only 0.1 to 0.7 wt. % (page 6, line 42). In addition the UV absorber mentioned there has an $M_n < 500$ (page 6, lines 43 to 45). The molecular weight of the polycarbonate is between 13,000 and 18,000 (page 2, lines 11 and 12). The sheets made from these polycarbonates are not produced by extrusion or coextrusion (page 6, line 64 to page 7, line 2). Thus the disclosure in EP 0 213 413 gives no indication of the solution to the problem mentioned here.

Japanese document Hei-2-225 558 describes the production of polycarbonate sheets by extrusion and has the objective of preparing sheets with extremely good surfaces (see the introduction of Hei). The polycarbonate used has an $\overline{M}_w$ of, for example, 27,700 (examples from Hei). In order to obtain sheets with good surfaces, partial esters of polyhydric alcohols are added, according to Hei (see Claim from Hei). Glycerine monostearate and pentaerythrityl monopalmitate are mentioned as partial esters for examples. Ester mixtures may also be used. Glycerine monostearate and mixtures with glycerine monostearate as the major component are preferred. UV absorbers in amounts of 0.1 to 0.7 wt. % may be added to the polycarbonates according to Hei, wherein UV absorbers with $M_n > 500$ are not mentioned. However, Hei-2-225 558 does not disclose UV protection provided by coatings and does not mention coextrusion.

Our comparison tests, however, show that the ester behaves quite differently (comparison D) and in addition that 0.7 wt. % of UV absorber is not sufficient to protect the coating against weathering (comparison E).

Although a mixture of 0.01 parts of glycerine monostearate and 0.03 parts of pentaerythrityl tetrastearate are added to the polycarbonate for extrusion in accordance with EP-A-0 300 485, example 1, page 8, as a mould release agent, the EP-A does not give any indication about the addition of UV absorbers.

Our EP-A-0 649 724 (Le A 29 892) disclosed a process for preparing multi-layered plastic sheets from branched polycarbonates with molecular weights $\overline{M}_w$ of 27,000 to 29,000 by coextrusion of a core layer and at least one outer layer with 1 wt. % to 15 wt. % of UV absorber. The plastic sheets obtained have excellent surfaces.

It is mentioned on page 5, line 9 of the EP-A, that conventional mould release agents may be added to the branched polycarbonates in addition to the UV absorber.

Now, if conventional mould release agents are added to the branched polycarbonates in EP-A-0 649 724 in the hope of being able to prepare polycarbonate sheets with good surface properties, even above the molecular weight of 29,500 which is critical for processing purposes, then it is found, surprisingly, that both pentaerythrityl tetrastearate and glycerine monostearate and mixtures of these two with glycerine monostearate as the major component, produce poor surfaces on the coextruded sheets with regard to both the deposition of UV absorber and polycarbonate abrasion.

Simply reversing the ratio of pentaerythritol tetrastearate and glycerine monostearate, surprisingly, leads to the production of coextruded sheets with excellent surfaces, even above the critical molecular weight of 29,500 claimed in EP-A-0 649 724.

According to EP-A-0 732 360, polycarbonates with a concentration of two types of esters (Claim 1) are disclosed. UV stabilisers may be added (page 3, line 11). The type and amount of UV stabiliser is not described.

Thermoplastic, aromatic polycarbonates for UV absorber-containing outer layers in the context of the present invention are either homopolycarbonates or copolycarbonates. The polycarbonates may be linear or branched in a known manner.

Some, up to 80 mol. %, preferably 20 mol. % to 50 mol. %, of the carbonate groups in the polycarbonates according to the invention may be replaced with aromatic dicarbonate groups. These types of polycarbonates which have both acid groups from carbonic acid and acid groups from aromatic, dicarboxylic acids incorporated in the molecular chain are more accurately called aromatic polyester carbonates. For simplicity they will be included, in the context of the present application, within the general term thermoplastic, aromatic polycarbonates.

Preparation of polycarbonates to be used according to the invention is performed in a known manner from diphenols, carbonic acid derivatives, optional chain terminators and optional branching agents, wherein some of the carbonic acid derivatives are replaced by aromatic, dicarboxylic acids or derivatives of dicarboxylic acids in order to prepare polyester carbonates, in fact in the same proportion as the carbonate structural units being replaced by aromatic dicarboxylate structural units in the aromatic polycarbonates.

Details relating to the preparation of polycarbonates have been given in hundreds of patents over the last 40 years. By way of example, reference is made here only to Schnell, "Chemistry and Physics of Polycarbonates", Polymer Reviews, Volume 9, Interscience Publishers, New York, London, Sydney 1964, to D. C. Prevorsek, B. T. Debona and Y. Kesten, Corporate Research Centre, Allied Chemical Corporation, Morristown, N.J. 07960, "Synthesis of Poly (ester Carbonate) Copolymers" in Journal of Polymer Science, Polymer Chemistry Edition, Vol. 19, 75–90 (1980), to D. Freitag. U. Grigo, P. R. Müller, N. Nouvertne, Bayer AG, "Polycaronates" in Encyclopedia of Polymer Science and Engineering, Volume 11, Second Edition, 1988, pages 648–718 and finally to Dres. U. Grigo, K. Kircher and P. R. Müller "Polycarbonate" in Becker/Braun, Kunststoff-Handbuch, Vol. 3/1, Polycarbonate, Polyacetale, Polyester, Celluloseester, Carl Hanser Verlag Munich, Vienna 1992, pages 117–299.

The thermoplastic polycarbonates, including thermoplastic, aromatic polyester carbonates, have average molecular weights $\overline{M}_w$ (determined by measuring the relative viscosity at 25° C. in $CH_2Cl_2$ at a concentration of 0.5 g/100 ml $CH_2Cl_2$) of 27,000 to 40,000, preferably 30,000 to 36,000 and in particular 32,000 to 36,000.

Diphenols which are suitable for preparing the polycarbonates to be used according to the invention are, for example, hydroquinone, resorcinol, dihydroxydiphenyl, bis-(hydroxyphenyl) alkanes, bis-(hydroxyphenyl)-cycloalkanes, bis-(hydroxyphenyl) sulfides, bis-(hydroxyphenyl)-ethers, bis-(hydroxyphenyl)-ketones, bis-(hydroxyphenyl) sulfones, bis-(hydroxyphenyl) sulfoxides, α,α'-bis-(hydroxyphenyl)-diisopropylbenzenes and their ring-alkylated and ring-halogenated derivatives.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis(3 -chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenols are described, for instance, in U.S. Pat. Nos. 3,028,635, 2,999,835, 3,148,172, 2,991,273, 3,271,367, 4,982,014 and 2,999,846, in German patents 1 570 703, 2 063 050, 2 036 052, 2 211 956 and 3 832 396, in French patent 1 561 518, in the monograph "H. Schnell, Chemistry and Physics of Polycarbonates, Interscience Publishers, New York 1964" and in Japanese patents 62039/1986, 62040/1986 and 105550/1986.

In the case of homopolycarbonates only one diphenol is used, in the case of copolycarbonates several diphenols are used.

Suitable chain terminators are either monophenols or monocarboxylic acids. Suitable monophenols are phenol itself, alkylphenols such as cresols, p-tertbutylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-tribromophenol.

Suitable monocarboxylic acids are benzoic acid, alkylbenzoic acids and halogenated benzoic acids.

Preferred chain terminators are phenols of the formula I

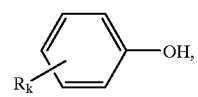

(I)

in which $R_k$ is hydrogen or a branched or non-branched $C_4$ to $C_9$ alkyl group. Those chain terminators in which $R_k$ is a branched or non-branched $C_8$ and/or $C_9$ alkyl group are particularly preferred.

The amount of chain terminator to be used is known to a person skilled in the art. The chain terminator may be added before, during or after phosgenation.

Suitable branching agents are trifunctional or more than trifunctional compounds known from polycarbonate chemistry, in particular those with three or more than three phenolic OH groups.

Suitable branching agents are, for example, phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenol-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)phenyl) orthoterephthalate, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of optionally-used branching agent is 0.05 mol. % to 2 mol. %, again with respect to moles of the particular diphenols used.

The branching agents may either be initially introduced with the diphenols and the chain terminators in the aqueous alkaline phase or may be added dissolved in an organic solvent before phosgenation.

All these measures for preparing polycarbonates are familiar to a person skilled in the art.

Aromatic dicarboxylic acids which are suitable for preparing polyester carbonates are for example, orthophthalic acid, terephthalic acid, isophthalic acid, t-butylisophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenylether dicarboxylic acid, 4,4'-diphenylsulfone dicarboxylic acid, 2,2-bis-(4-carboxyphenyl)-propane, trimethyl-3-phenylindane-4,5'-dicarboxylic acid.

Particularly preferred dicarboxylic acids are terephthalic acid and/or isophthalic acid.

Derivatives of dicarboxylic acids are dicarboxylic acid dihalides and dialkyl dicarboxylates, in particular dicarboxylic acid dichlorides and dimethyl dicarboxylates.

Replacement of carbonate groups by aromatic dicarboxylate groups takes place substantially stoichiometrically and also quantitatively so that the molar ratio between the reaction partners is replicated in the final polyester carbonate. Incorporation of the aromatic dicarboxylate groups may be performed either randomly or blockwise.

Preferred methods of preparation of the polycarbonates to be used according to the invention, including polyester carbonates, are the known interface process and the known melt transesterification process.

In the first case the acid derivatives are preferably phosgene and optionally dicarboxylic dichlorides, in the latter case acid these derivatives are preferably diphenyl carbonate and optionally diesters of dicarboxylic acids. The catalysts, solvents, working-up procedures, reaction conditions, etc for the preparation of polycarbonates or polyester carbonates have been sufficiently described in both cases and are well known.

Monoesters formed from glycerine and a fatty acid are those of glycerine with saturated aliphatic $C_{10}$–$C_{26}$ monocarboxylic acids, preferably saturated aliphatic $C_{14}$–$C_{22}$ monocarboxylic acids.

Monoesters formed form glycerine and a fatty acid are understood to use either the primary OH function in glycerine or the secondary OH function in glycerine and also mixtures of these two isomeric classes of compounds.

Saturated, aliphatic, monocarboxylic acids with 10 to 26 carbon atoms are for example capric acid, lauric acid, myristic acid, palmitic acid, stearic acid, arachidic acid, behenic acid, lignoceric acid and cerotic acid.

Preferred, saturated, aliphatic, monocarboxylic acids with 14 to 22 carbon atoms are for example myristic acid, palmitic acid, stearic acid, arachidic acid and behenic acid.

Particularly preferred, saturated, aliphatic, monocarboxylic acids are palmitic acid, stearic acid, and behenic acid.

Saturated, aliphatic $C_{10}$–$C_{26}$ carboxylic acids and the monoesters formed from glycerine and a fatty acid for use according to the invention are either known as such from the literature or can be prepared using processes known from the literature (see for example Fieser and Fieser, Organische chemie GmbH, Weinheim, Bergstr. 1965, chapter 30, pages 1206 et seq). Example of monoesters formed from glycerine and a fatty acid are those with the particularly preferred monocarboxylic acids mentioned previously.

(Partial)esters of tetra- to hexahydric alcohols are likewise those of tetra-, penta- or hexahydric alcohols with saturated, aliphatic $C_{10}$–$C_{26}$ monocarboxylic acids, preferably with saturated, aliphatic $C_{14}$–$C_{22}$ monocarboxylic acids and in particular with palmitic, stearic and behenic acid.

Completely esterified alcohols are preferred over partially esterified alcohols; similarly tetrahydric alcohols are preferred over pentahydric or hexahydric alcohols.

Suitable saturated aliphatic $C_{10}$–$C_{26}$ monocarboxylic acids are those which are listed above; preferred and particularly preferred carboxylic acids are also mentioned above.

Tetrahydric alcohols are, for example, pentaerythritol and mesoerythritol.

Pentahydric alcohols are, for example, arabitol, ribitol and xylitol.

Hexahdyric alcohols are, for example, mannitol, glucitol (sorbitol) and dulcitol.

Esters of tetra- to hexahydric alcohols and saturated, aliphatic, monocarboxylic acids are either known as such from the literature or can be prepared by methods given in the literature.

Esters for use according to the invention are, for example, pentaerythrityl tetrastearate, pentaerythrityl tetrapalmitate, pentaerythrityl tetramyristate, pentaerythrityl tetralaurate, mesoerythrityl tetralaurate, mesoerythrityl tetrastearate, mesoerythrityl tetramyristate, xylityl pentastearate, xylityl pentatridecanoate, xylityl pentapalmitate, arabityl pentastearate, arabityl pentapalmitate, sorbityl hexastearate, sorbityl hexapentadecanoate, sorbityl hexapalmitate, dulcityl hexamonodecanoate, dulcityl hexapalmitate, mannityl hexastearate, mannityl hexamyristate and mannityl hexalaurate.

Partial esters suitable for use according to the invention are, for example, pentaerythrityl distearate, pentaerythrityl tristearate, pentaerythrityl mono-, di- and tripalmiate, mesoerythrityl trilaurate, xylityl di-, tri- and tetrastearate, xylityl di-, tri- and tetradecanoate, sorbityl tri-, tetra- and pentastearate and sorbityl tri-, tetra-, and pentamonodecanoate. Mixtures, in particular random mixtures, of partial esters suitable for use according to the invention may also be used. (See U.S. Pat. No. 4,131,575 (Le A 16 284-US-(IP)).

Suitable UV absorbers are those commands which are capable of actively protecting polycarbonate from UV light, due to their absorptive capacity at wavelengths below 400 nm, and which have a molecular weight of more than 370, preferably 500 g/mol or more.

Suitable UV absorbers are in particular those of the formula (II)

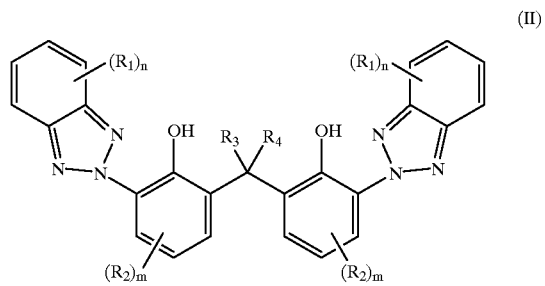

(II)

in which
  $R^1$ and $R^2$ are identical or different and represent H, halogen, $C_1$–$C_{10}$ alkyl, $C_5$–$C_{10}$ cycloalkyl, $C_7$–$C_{13}$ aralkyl or $C_6$–$C_{14}$ aryl groups, or —$OR^5$ or -(CO)-O—$R^5$, where $R^5$=H or a $C_1$–$C_4$ alkyl group, $R^3$ and $R^4$ are also identical or different and represent H, $C_1$–$C_4$ alkyl, $C_5$–$C_6$ cycloalkyl, benzyl or $C_6$–$C_{14}$ aryl groups, m is 1, 2 or 3 and n is 1, 2, 3, or 4, and also those of the formula (III)

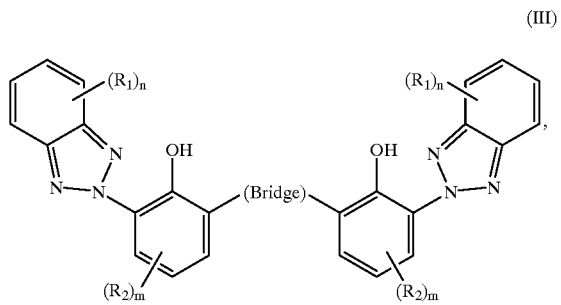

(III)

in which the "bridge" represents

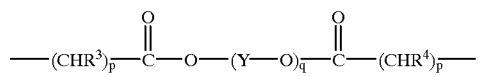

$R^1$, $R^2$, m and n are defined in the same way as for formula (II), in which in addition p is an integer from 0 to 3, q is an integer from 1 to 10, Y represents —$CH_2$-$CH_2$-, -$(CH_2)_3$-, -$(CH_2)_4$-, -$(CH_2)_5$-, -$(CH_2)_6$- or

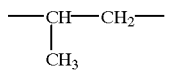

and $R^3$ and $R^4$ are defined in the same way as for formula (II).

Another suitable UV absorber is, for example, Tinuvin 840 from Ciba AG. Further suitable UV absorbers are those which constitute substituted triazines such as, for example, 2,4-bis-(2,4-dimethylphenyl)-6-(2-hydroxy-4-n-octyloxyphenyl)-1,3,5-triazine, which is sold by the Cytec company under the name CYASORB UV-1164 (molecular weight 510), and 2-(4,5-diphenyl-1,3,5-triazine-2-yl)-5-(hexyl)oxyphenyl, which is marketed by Ciba under the name Tinuvin 1577 (molecular weight 383).

A particularly preferred UV absorber is 2,2-methylene-bis-(4-(1,1,3,3-tetramethylbutyl)-6-(2H-benzotriazole-2-yl) phenyl), which is sold under the trade name Tinuvin 360 by Ciba AG or is commercially available as Mark LA 31.

The UV absorber is incorporated into the polycarbonates in a known manner by mixing polycarbonate granules with the UV absorber(s) followed by extrusion or by mixing solutions of the polycarbonates in organic solvents, for example in $CH_2Cl_2$, with solutions of the UV absorber in the same or a different solvent, for example in acetone, and then evaporating off the solvent in a known manner.

The mould release agent may be incorporated in a similar manner.

The present invention also provides a process for preparing moulding compositions according to the invention which is characterised in that either the polycarbonate granules are mixed with the UV absorber and the two mould release agents in a known manner and then extruded, or solutions of the polycarbonates in organic solvents are mixed with solutions of the UV absorber and the two mould release agents in the same or different solvents in a known manner and the solvent or solvents are evaporated off in a known manner.

Furthermore, stabilisers which are known for polycarbonates, such as phosphines, phosphites or silicon-containing stabilisers may be added. The addition of flame retardants, pigments, colorants, finely divided minerals and other additives is also possible. Addition may take place before, together with or after addition according to the invention of the UV absorber and mould release agents.

The UV absorber-containing outer layer made of the polycarbonates according to the invention has a thickness of 10 μm to 100 μm.

Polycarbonate sheets which are coated in accordance with the invention are either solid sheets, preferably with a thickness of 0.5 mm to 15 mm, or hollow sheets or twin-wall sheets, preferably with a thickness of 4 mm to 40 mm.

These types of sheets made of polycarbonate are known from the literature and in practice. They may consist of linear or branched thermoplastic polycarbonates with a molecular weight $\overline{M}_w$ (weight average, determined by measuring the relative viscosity in $CH_2Cl_2$ at 25° C. at a concentration of 0.5 g in 100 ml of $CH_2Cl_2$) between 27,000 and 40,000, preferably between 30,000 and 36,000 and in particular between 32,000 and 36,000. In other respects, reference is made to the specifications for the linear and branched polycarbonates for the UV absorber-containing top layer, wherein addition of chain terminators to adjust the relevant molecular weight is a procedure which is familiar to a person skilled in the art.

Polycarbonate sheets which are coated in accordance with the invention may naturally also contain the conventional small amount of UV stabiliser, that is for example 0.1 wt. % to 0.5 wt. %, with reference to the weight of polycarbonate sheet without the coating.

Furthermore, polycarbonate sheets which are coated according to the invention may also contain other additives which are conventionally added to for thermoplastic polycarbonates.

The UV absorber and other conventional additives in the polycarbonate sheets are incorporated, for example, in the corresponding polycarbonate granules in a known manner, before these are processed to produce polycarbonate sheets.

Coextrusion as such is known from the literature (see for example EP 110 221 and EP 110 238). In the present case the procedure is as follows:

Extruders for producing the core layer and the outer layer(s) are connected to a coextrusion adapter. The adapter is designed so that the melts forming the outer layers are applied as thin layers which adhere to the melt forming the core layer.

The multi-layer melt extrudate prepared in this way is then made into the desired shape (twin-wall or solid sheets) using a die which is connected in series. Then the melts are cooled under controlled conditions in a known manner using calendering (solid sheets) or vacuum sizing (twin-wall sheets) and then cut into lengths. An annealing oven may optionally be used to eliminate stresses after sizing or calendering.

Instead of using an adapter attached upstream of the die, the die itself may be designed in such a way that the melts are brought together within the die.

The laminated materials made of thermoplastic polycarbonates obtained according to the process according to the invention can be used wherever moulded articles, in particular sheets made of thermoplastic polycarbonate, are exposed to the weather, that is in greenhouse, railway station concourses, etc.

The surfaces of laminated materials obtained according to the invention may also be processed at a later stage, e.g. scratch resistant lacquers may be applied or water-dispersant layers may be affixed.

EXAMPLES

The machines and equipment for preparing multi-layered solid and twin-wall sheets are described below.

1. Device for Producing Twin-Wall Sheets
1.1 The device consists of the main extruder with a screw of length 33 D and a diameter of 70 mm with a degassing device the coex adapter (feedblock system)

a coextruder for applying the outer layer with a screw of length 25 D and a diameter of 30 mm the special broad slit die of width 350 mm the sizer the roller conveyor belt the take-off device the cutting device (saw)

the stacking table.

Polycarbonate granules of the main material are supplied to the hopper in the main extruder, the UV coextrusion material is supplied to the hopper on the coextruder. Melting and feeding the particular material is performed in the relevant plasticising system consisting of a cylinder and screw. The two material melts are combined in the coex adapter and form a composite material after passing through the die and cooling in the sizer. The other devices are used to transport, cut up and stack the extruded sheets.

The following mixtures were used as UV coextrusion material:

Mixture A consisted of a bisphenol A polycarbonate, branched with 0.3 mol. % of isatinic biscresol, with $\overline{M}_w$ 28,000 and a relative solution viscosity of 1.28, to which was added 0.23 wt. % of pentaerythrityl tetrastearate and 7.0 wt. % of the dimeric UV absorber Tinuvin 360 or Mark LA 31 of the formula (IIa)

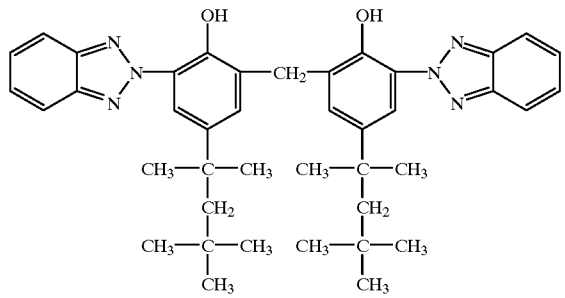

(comparison).

Mixture B was the same as mixture A with the exception that instead of the pentaerythrityl tetrastearate, 0.2 wt. % of glycerine monostearate was used (comparison).

Mixture C was the same as mixture A with the difference that the amount of pentaerythrityl tetrastearate was reduced to 0.2 wt. % and 0.05 wt. % of glycerine monostearate was also added (invention).

Mixture D was the same as mixture A with the different that the amount of pentaerythrityl tetrastearate was reduced to 0.05 wt. % and 0.2 wt. % of glycerine monostearate was added (comparison).

Mixture E was the same as mixture D with the different that the amount of UV absorber Mark LA 31 or Tinuvin 360 was not 7.0 wt. % but was 0.7 wt. % (comparison).

The polycarbonate main material in all cases was the same branched bisphenol A polycarbonate with $\overline{M}_w$ 28,000.

Unevenness: the unevenness was assessed visually with glancing incident light.

Deposition of UV absorber: the amount of UV absorber at the entrance to the sizer (inlet phase) was evaluated after 5 hours' production time.

PC abrasion: the amount of powdery deposit in the sizer was evaluated after a run time of 5 hours.

Yellowness index: the yellowness index was determined on unweathered and weathered twin-wall sheets in accordance with DIN 6167. The twin-wall sheets were weathered in a xenon weathermeter in accordance with DIN 53 387.

Tackiness: the tackiness was assessed using the intensity of adhesive markings on the surface of the sheets after leaving the polishing stack.

The results are given in the table below.

| | UV batch using: | Quality features of PC sheets | | | |
|---|---|---|---|---|---|
| | | Unevenness | Deposit of UV absorber | PC abrasion | Yellowness index after 2000 h in Xe WOM |
| $A_{(C)}$ | 7% Tinuvin 360 + 0.23% PETS | marked | marked | slight | 3 |
| $B_{(C)}$ | 7% Tinuvin 360 + 0.2% GMS | slight | slight | marked | 3 |
| $C_{(I)}$ | 7% Tinuvin 360 + 0.2% PETS + 0.05% GMS | slight | slight | slight | 3 |
| $D_{(C)}$ | 7% Tinuvin 360 + 0.05% PETS + 0.2 GMS | slight | slight | marked | 3 |

-continued

| | UV batch using: | Unevenness | Deposit of UV absorber | PC abrasion | Yellowness index after 2000 h in Xe WOM |
|---|---|---|---|---|---|
| E(C) | 0.7% Tinuvin 360 + 0.05% PETS + 0.2 GMS | slight | slight | marked | 8 |

Although in the case of mixture A the lubricating effect between plastic and metal in the sizer is improved by using a mould release agent, after a certain production time deposited UV absorber has to be removed from the sizer since the transverse unevenness of the twin-wall plate exceeds the permissible extent and/or because deposits of UV absorber are found on the surface of the sheets.

With mixture B, increase friction in the sizer was observed as a negative effect and this led on the one hand to the production of noise (high pitched whistling) and on the other hand to increase PC abrasion, with the results that powdered deposits were found on the sheets. These deposits caked together during the annealing procedure following sizing and thus led to quality defects on the surface of the sheets.

Mixture C had exceptional processing behaviour. Non-permissible unevenness and/or deposits of UV absorber occurred at a much later point. Troublesome abrasion of the sheets (powdered PC) was not observed. The interval between cleansing procedures could be greatly extended as compared with tests A and B, i.e. this interval could be doubled or tripled.

2. Device for Producing Coextruded Solid Sheets
2.1 The evice onsists of
the main extruder with a screw of length 33 D and a diameter of 75 mm with a degassing device
the coex adapter (feedback system)
a coextruder for applying the outer layer with a screw of length 25 D and
a diameter of 30 mm
a wide slit die of width 600 mm
a polishing stack with a horizontal arrangement, wherein the third roller can be tilted by 45° with respect to the horizontal
the roller conveyor belt
the take-off device
the cutting device (saw)
the stacking table.

The polycarbonate main material and the polycarbonate UV coextrusion materials A), B) and C) are the same as those described for twin-wall sheet production.
2.2 Performing the trials
Polycarbonate granules of the main material are fed to the hopper on the main extruder, the UV coextrusion material is supplied to the hopper on the coextruder. Melting and feeding the particular material took place in the relevant plasticising system comprising of cylinder and screw. Both material melts are led into the coex adapter and form a composite material after leaving the die and cooling on the polishing stack. The UV coex layer may be applied to one side only or to both sides of the core layer. The other devices are used for transporting, cutting up and stacking the extruded sheets.

When producing sheets thicker than 1 mm, the melt from the die passes into the gap between rollers 1 and 2 and there is subjected to polishing and cooling on both sides at the roller surfaces. For this purpose a small excess of melt has to be used and this is located in the so-called ridge or bulge in front of the gap between the rollers.

When preparing sheets less than 1 mm thick the mix may be processed in the gap between the rollers without a polishing procedure (chill roll process).

The table given below shows the results obtained during the production of solid sheets:

| UV batch using | Adhesive effect of solid sheets on the rollers |
|---|---|
| A) | marked |
| B) | marked |
| C) | slight |

Although the adhesive effect with mixtures A) or B) is reduced as compared to a UV batch without lubricant or mould release agent, surface defects still occur on the sheets and the quality is impaired.

In the case of mixture C) the adhesive tendency is reduced still further so that optimum quality is achieved.

What is claimed is:
1. Moulding compositions containing
 a) thermoplastic, aromatic polycarbonates with a weight average molecular weight $\overline{M}_w$ of 27,000 to 40,000,
 b) a concentration of UV absorber with a molecular weight of 370 or more in amounts of 3.5 wt. % to 20 wt. %, with respect to the weight of polycarbonate and
 c) 2 types of mould release agent comprising
  c.1) monoesters formed from glycerine and a fatty acid, in amounts of 0.01 to 0.1 wt. %, with respect to the weight of polycarbonate, and
  c.2) (partial)esters of tetra- to hexahydric alcohols, in amounts of 0.05 to 0.25 wt. %, with respect to the weight of polycarbonate,
characterised in that the ratio by weight of c.1) to c.2) is between 1:25 and 1:2.
2. Moulding compositions according to claim 1, characterised in that the ratio by weight of c.1) to c.2) is between 4:25 and 10:25.
3. A process for preparing moulding compositions according to claim 1, characterised in that either the polycarbonate granules are mixed with the UV absorber and the two mould release agents and then extruded in a known manner or solutions of the polycarbonates in organic solvents are mixed with solutions of the UV absorber and the two mould release agents in the same or different solvents in a known manner and the solvent or solvents are evaporated in a known manner.
4. A method of using of the moulding compositions according to claim 1 comprising making a UV absorber-containing outer layers.

5. A method of using of the moulding compositions according to claim 1 comprising making an external layer on coextruded polycarbonate sheets.

6. A process for preparing laminated materials made of thermoplastic polycarbonates using the known method of coextrusion, characterised in that the moulding compositions according to claim 1 are used for the external layer on the laminated materials.

7. Laminated materials made of thermoplastic polycarbonate prepared by the process of claim 6.

* * * * *